N. M. HOPKINS.
DYNAMOMETER FOR EXPLOSION ENGINES.
APPLICATION FILED FEB. 12, 1908.

903,090.

Patented Nov. 3, 1908.

2 SHEETS—SHEET 1.

N. M. HOPKINS.
DYNAMOMETER FOR EXPLOSION ENGINES.
APPLICATION FILED FEB. 12, 1908.

903,090.

Patented Nov. 3, 1908.
2 SHEETS—SHEET 2.

Witnesses:

Inventor:
Nevil Monroe Hopkins,
Att'ys,

UNITED STATES PATENT OFFICE.

NEVIL MONROE HOPKINS, OF WASHINGTON, DISTRICT OF COLUMBIA.

DYNAMOMETER FOR EXPLOSION-ENGINES.

No. 903,090.  Specification of Letters Patent.  Patented Nov. 3, 1908.

Application filed February 12, 1908. Serial No. 415,571.

*To all whom it may concern:*

Be it known that I, NEVIL MONROE HOPKINS, a citizen of the United States, residing at Washington, in the District of Columbia, have invented certain new and useful Improvements in Dynamometers for Explosion-Engines, of which the following is a specification.

This invention is an instrument for determining and visually indicating the working condition of explosion engines, based on the principle that the kinetic energy due to the explosion of a gas-mixture is a function of the temperature of the gaseous reaction-products. The instrument comprises a temperature-responsive device, preferably in the engine-cylinder and in proximity to the point of gas-ignition, and an external indicator.

In its preferred embodiment, the instrument fundamentally comprises a thermo-couple, having its junction within the engine-cylinder and serving as the temperature-responsive device, and a milli-voltmeter, electrically connected to the thermo-couple and serving as the dynamometric indicator. The thermo-couple is carried by the usual sparking-plug or other sparking device used to explode the gas-mixture, thus being at the point of gas-ignition and maximum reaction-temperature. When the instrument is applied to a multi-cylinder engine, a single voltmeter suffices as an indicator, having a switch for connecting the terminals of the voltmeter selectively with those of the thermo-couple in any particular engine-cylinder, or, in series, with the thermo-couples of two or more adjacent cylinders, so that the combined electro-motive force of all is indicated. When the instrument is applied to an automobile engine, the switch may have contacts for alternatively connecting the voltmeter to a small dynamo, the rotor of which is coupled or geared to a wheel of the automobile. The voltmeter is then provided with a second scale calibrated to indicate the speed of the automobile in miles per hour, so that it serves both as an energy-indicator and as a tachometer.

Figure 1:
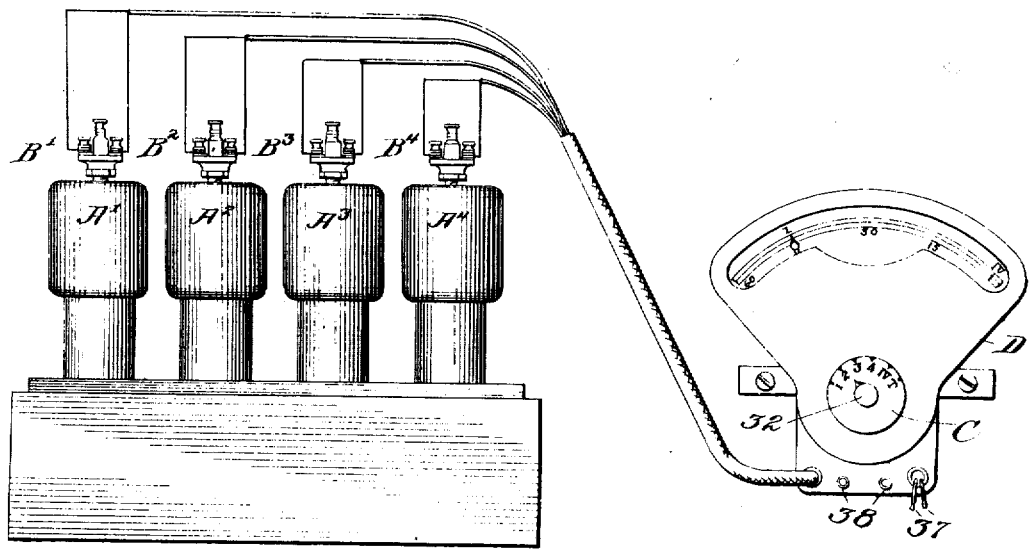
Figure 2:
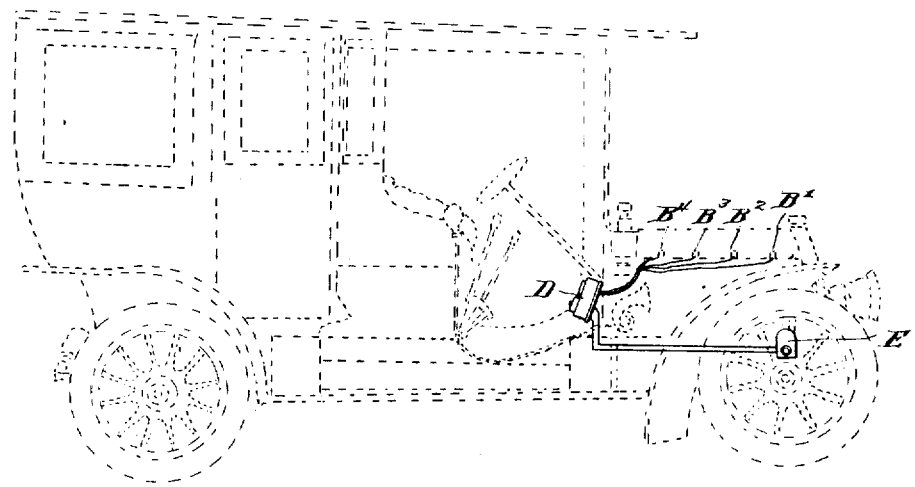
Figure 3:
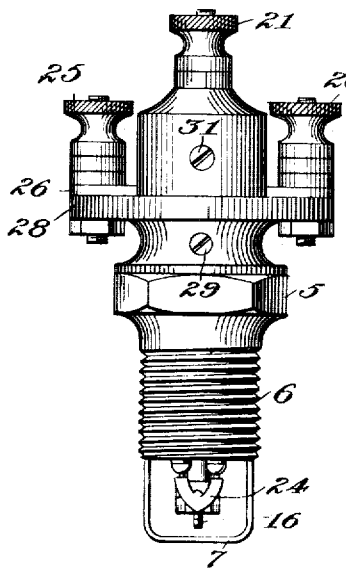
Figure 4:
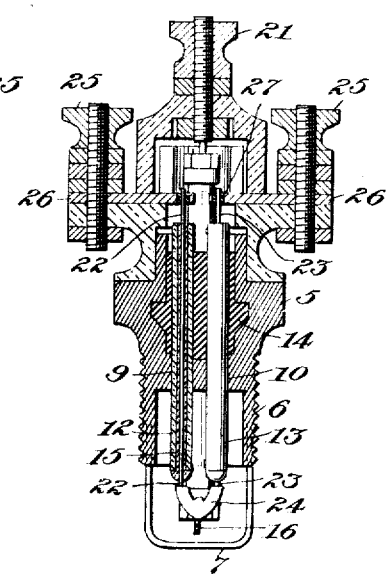
Figure 5:
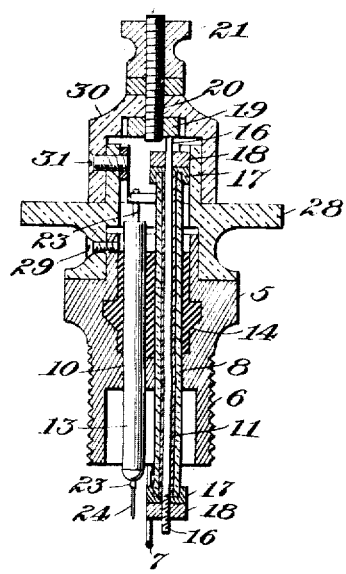
Figure 6:
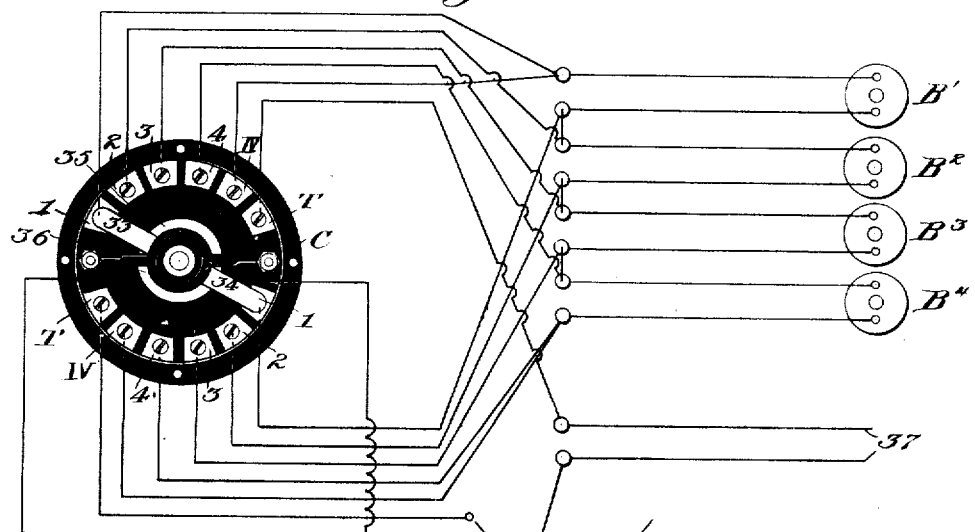
Figure 7:
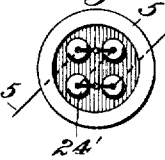

Referring to the accompanying drawings: Figure 1 is a diagrammatic side elevation of a four-cylinder engine, each spark-plug of which has thermo-couple terminals connected to a milli-voltmeter containing a switch; Fig. 2 is a diagrammatic side elevation of a gasolene automobile, provided with the dynamometer and with a tachometer-dynamo electrically connected to one set of terminals of the milli-voltmeter switch; Fig. 3 is a side elevation of a combined spark-plug and thermo-couple; Figs. 4 and 5 are transverse vertical sections, at a right-angle, of the combined spark-plug and thermo-couple; Fig. 6 is a diagrammatic view of the switch connections of the milli-voltmeter; and Fig. 7 is a bottom end view of a plug carrying a thermo-pile only.

The explosion engine shown in Fig. 1 comprises four cylinders, $A^1$, $A^2$, $A^3$, $A^4$, respectively provided with combined spark-plugs and thermo-couples $B^1$, $B^2$, $B^3$, $B^4$, each of which is separately connected to the switch C of a milli-voltmeter D. A tachometer-dynamo E is also connected to the switch C.

The combined spark-plug and thermo-couple illustrated in Figs. 3, 4, 5, comprises a tubular metal body 5, having a threaded end 6 which is screwed into the explosion-chamber of an engine-cylinder.

The inner end of the body carries a projecting wire loop 7, constituting one of the sparking electrodes. The body has three longitudinal openings 8, 9, 10, which receive insulating tubes 11, 12, 13, preferably of porcelain or lava. A filling 14 of lead is cast into the body and onto the insulating tubes, fixing them in place and making a gastight joint. To improve the insulation, each of the tubes 11, 12, 13, preferably contains a glass lining-tube 15, the ends of which are fused to those of the outer tube, to make a gastight joint.

The tube 11 contains a straight piece of heavy wire 16, serving as the second sparking electrode. Metal caps 17 inclose the ends of the tube 11 and have central openings receiving the wire 16. Nuts 18 are threaded on the ends of the wire 16 and clamp the caps 17 onto the ends of the tube 11. The upper end of the wire 16 is loosely in contact with a retaining nut 19, on the shank 20 of a binding-post 21 which is connected to the usual source of electric current.

The insulating tubes 12, 13, contain wires 22, 23, respectively, of dissimilar difficulty-fusible metals or alloys, for example one wire of platinum and another of a platinum-rhodium alloy, and the lower ends of these wires are fused together to provide a thermo-electric junction 24. This junction is preferably rolled thin, so as to quickly receive and discharge heat. The tubes 12, 13, are of such thickness and material and extend downward from the body 5 for such predetermined distance as to permit an outflow of heat from the hot explosion-gases, through the wires 15, 16, tubes 12, 13, cast lead 14, and body-piece 5, to the engine-cylinder, just sufficient to maintain these exposed ends and the thermo-junction 24 below the ignition-point of the gas-mixture. Premature firing of the gas-mixture by reason of these exposed portions attaining a high temperature is thereby prevented. The upper ends of the wires 22, 23 are connected to binding-posts 25, which receive wires leading to one set of contacts of the voltmeter switch C. This connection is preferably effected by brass strips 26, which extend from the binding-posts and have holes into which the ends of the wires 22, 23 are soldered. These holes are drilled considerably larger than the wires and are cast full of solder. The body of solder 27 is then drilled with a small hole, through which the wire is passed and in which it is then secured by raising the whole to the soldering-point. The wires of the thermo-couple are thus mechanically out of contact with the brass terminal-strips, the electrical connection being made by the solder. By this construction changes of atmospheric temperature do not occasion variations in the readings given by the thermo-couple. The binding-posts 25 are secured in holes in the opposite sides of a flanged porcelain support 28, which surrounds the upper end of the metal body-piece 5 and is secured thereto by a screw 29. The binding-post 21 is carried by a porcelain cap 30, which incloses opposed projections on the upper end of the porcelain piece 28 and is secured thereto by a screw 31.

Fig. 7 shows a plug 5' which carries a thermo-pile 24', only, instead of a single couple. This fitting may be secured in any cylinder-opening communicating directly or indirectly with the explosion-chamber, ignition of the gases being effected by any usual means.

The switch C has contacts which are inclosed in the case of the milli-voltmeter D, and an external revoluble knob 32 carrying a pointer. The switch connections, shown in Fig. 6, comprise separate insulated contact-arms 33, 34, which are rigidly secured to the inner end of the knob 32. These arms are arranged to slide, respectively, on semi-annular insulated contact-pieces 35, 36, which are connected to the ends of the winding of the milli-voltmeter D. The outer ends of the arms 33, 34, are arranged to successively bear on pairs of opposed contact-pieces, 1, 2, 3, 4, which are respectively connected to the binding-posts of the thermo-couples $B^1$, $B^2$, $B^3$, $B^4$. These four sets of binding-posts are also connected, in series, to a fifth set of switch contacts marked IV. The dynamometer scale of the milli-voltmeter has two divisions, marked respectively I and IV. The switch C has five external indices, 1, 2, 3, 4 and IV. When the pointer of the switch-knob 32 is turned toward either of the index numerals 1, 2, 3, 4, the thermo-couple of the engine cylinder $A^1$, $A^2$, $A^3$, or $A^4$, is put in circuit with the winding of the voltmeter. The voltmeter is so wound that the reading thereon due to the maximum electromotive force produced in any thermo-couple by the explosion in any cylinder, under the ideal conditions, is I, or thereabouts. If the pointer on the switch-knob is directed toward either of the index numerals 1, 2, 3, or 4, and the reading on the voltmeter scale is below I, some one of the conditions of the explosion is imperfect: for example the amount of combustible vapor, or the proportion of vapor and air; the amount of compression; or the amperage or timing of the ignition-spark. The attention of the operator is thereby at once called to the fact that the carbureter, spark-coil, or timer require adjustment; or that the cylinder, the valves or the pipes are leaking. If the pointer of the switch-knob is turned toward the index numeral IV, the voltmeter then indicates the combined voltages of the four thermo-couples and the corresponding reading on its dial should be IV. The switch C is also provided with a sixth set of terminals marked T, which are connected by leads 37, through a variable resistance R, to a tachometer dynamo E, shown in Fig. 2 as driven by one wheel of an automobile. The voltmeter D is shown mounted on this vehicle to confront the operator, the connections to the thermo-couples of four engine-cylinders being also shown. When the pointer of the switch-knob 32 is turned to the index-letter T, the dynamo E is thereby coupled to the voltmeter, which has a lower scale, indicating speed in miles per hour.

The winding of the voltmeter has independent binding-posts 38, which may be used in connection with an external shunt to determine the working condition of the sparking batteries.

I claim:

1. In combination with an explosion-engine, a dynamometer, comprising a thermo-couple within the engine-cylinder, means for maintaining said thermo-couple at a temperature below the ignition-point of the explosive-mixture, and an electric indicator connected to said thermo-couple.

2. In combination with an explosion-engine, a dynamometer, comprising a temperature-responsive device within the engine-cylinder and in proximity to the gas-igniter, means for maintaining said device at a temperature below the ignition-point of the explosive-mixture, and an external indicator connected to said device.

3. In combination with an explosion-engine, a dynamometer, comprising a thermo-couple within the engine-cylinder and in proximity to the gas-igniter, means for maintaining said thermo-couple at a temperature below the ignition-point of the explosive-mixture, and an electric indicator connected to said thermo-couple.

4. In combination, an explosion-engine cylinder, a removable fitting making a gas-tight joint with said cylinder, a gas-igniter and a temperature-responsive device, carried by said fitting, and an external indicator connected to said temperature-responsive device.

5. In combination, an explosion-engine cylinder, a fitting making a gas-tight joint with said cylinder, a gas-igniter and a thermo-couple, carried by said fitting, and an external electric indicator connected to said thermo-couple.

6. In combination, a multi-cylinder explosion-engine, a temperature-responsive device within each cylinder, an external indicator, and means for selectively coupling the indicator to the temperature-responsive device of any cylinder.

7. In combination, a multi-cylinder explosion-engine, a temperature-responsive device within each cylinder, an external indicator, and means for selectively coupling the indicator to the temperature-responsive device of any cylinder or to the devices of a group of adjacent cylinders.

8. In combination, a multi-cylinder explosion-engine, a thermo-couple within each cylinder, an external electric indicator, and a switch for selectively coupling the indicator to the thermo-couple of any cylinder or to the thermo-couples of a group of adjacent cylinders.

9. In combination, a multi-cylinder explosion-engine, a thermo-couple within each cylinder, an external electric indicator, and a switch for selectively coupling the indicator to the thermo-couple of any cylinder or in series to the thermo-couples of a group of adjacent cylinders.

10. In combination with a conveyance and an explosion-engine for driving said conveyance, a thermo-couple in position to receive heat from the explosion-gases, a dynamo driven by the movement of said conveyance, an electric indicator having a dynamometer scale and a tachometer scale, and a switch for coupling the indicator either to the thermo-couple or to the dynamo.

11. In combination, a fitting adapted to make a gas-tight joint with an explosion-engine cylinder, a thermo-couple carried by said fitting, and means for maintaining said thermo-couple at a temperature below the ignition-point of the explosive-mixture.

12. In combination, a fitting adapted to make a gas-tight joint with an explosion-engine cylinder, and a gas-igniter and a temperature-responsive device carried, in proximity, by said fitting.

13. In combination, a fitting adapted to make a gas-tight joint with an explosion-engine cylinder, and a gas-igniter and a thermo-couple carried, in proximity, by said fitting.

14. In combination, a support having three openings, insulating tubes extending through said openings, a metallic filling cast into said support and onto said tubes, a thermo-couple having leads extending through two of said tubes, and a sparking-electrode having a lead extending through the third tube.

15. In combination, a support, insulating tubes carried by said support, and a thermo-couple, comprising wires extending through said tubes and having a fused junction flattened into a thin broad piece.

In testimony whereof, I affix my signature in presence of two witnesses.

NEVIL MONROE HOPKINS.

Witnesses:
EUGENE A. BYRNES,
C. W. FOWLER.